United States Patent
Marin et al.

(10) Patent No.: US 7,958,802 B2
(45) Date of Patent: Jun. 14, 2011

(54) BEARING ASSEMBLY

(75) Inventors: Carlos E. Marin, Milan, MI (US); Clinton E. Carey, Monroe, MI (US); Leonid Basin, Farmington Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 275 days.

(21) Appl. No.: 12/263,605

(22) Filed: Nov. 3, 2008

(65) Prior Publication Data

US 2009/0120235 A1 May 14, 2009

Related U.S. Application Data

(60) Provisional application No. 60/986,471, filed on Nov. 8, 2007.

(51) Int. Cl.
*F16H 57/04* (2010.01)
(52) U.S. Cl. .................................................. 74/606 R

(58) Field of Classification Search ............... 74/606 R, 74/607; 384/99; 184/6.12, 11.1
See application file for complete search history.

(56) References Cited

U.S. PATENT DOCUMENTS

| | | | | |
|---|---|---|---|---|
| 3,320,005 A * | 5/1967 | Anno et al. | | 384/127 |
| 3,811,743 A * | 5/1974 | Wren | | 384/475 |
| 3,813,136 A * | 5/1974 | Pitner | | 384/559 |
| 4,869,604 A * | 9/1989 | Hill et al. | | 384/569 |
| 4,968,157 A * | 11/1990 | Chiba | | 384/462 |
| 5,803,616 A * | 9/1998 | Persson et al. | | 384/473 |
| 6,161,964 A * | 12/2000 | Fukao | | 384/560 |
| 6,871,627 B2 * | 3/2005 | Fujikubo | | 123/196 R |
| 7,211,025 B2 * | 5/2007 | Fujioka | | 477/8 |

* cited by examiner

*Primary Examiner* — Vicky A Johnson

(57) ABSTRACT

A bearing assembly for use between two components in a transmission includes an inner member located within an outer member. The inner member includes a plurality of bearing element windows and a bearing element is located within each bearing element window. The inner member is biased against the outer member by a spacer member. Fluid is able to flow through and/or around the spacer member between the two components of the transmission.

14 Claims, 1 Drawing Sheet

BEARING ASSEMBLY

CROSS-REFERENCE TO RELATED APPLICATIONS

This application claims the benefit of U.S. Provisional Application No. 60/986,471 filed on Nov. 8, 2007. The disclosure of the above application is incorporated herein by reference.

FIELD

The invention relates generally to a bearing assembly in a transmission, and more particularly to a needle bearing assembly in a transmission operable to allow fluid to flow through the needle bearing assembly.

BACKGROUND

The statements in this section merely provide background information related to the present disclosure and may or may not constitute prior art.

A conventional transmission includes a rotating element or rotator, such as an input shaft assembly, located within a stationary element or stator, such as a transmission housing. Both the stator and rotator may include a plurality of fluid transfer passages for communicating a fluid, such as an oil or other lubrication and cooling fluids, to various locations within the transmission. Accordingly, it may be necessary for fluid to communicate between the rotator and the stator.

The rotator is typically supported for rotation within the stator by a plurality of bearing assemblies. The bearing assemblies allow for relative rotation between the stator and the rotator. A typical bearing assembly includes a windowed cage having a needle bearing or rolling element located within each window or bearing element window. While useful for its intended purpose, these bearing elements may interfere with the communication of fluid between the rotator and the stator. Accordingly, there is a need in the art for a bearing assembly used in a transmission that allows fluid communication through the bearing assembly.

SUMMARY OF THE INVENTION

In an aspect of the present invention, a transmission assembly supported in a transmission housing is provided. The transmission assembly has a bearing assembly supporting a sleeve shaft and a rotatable shaft. The sleeve shaft is disposed within a cavity of the transmission housing. The sleeve shaft has at least one radially extending fluid communication passage and a central bore that defines a sleeve shaft cavity. The rotatable shaft has at least one radially extending fluid communication passage and a central bore that defines a central fluid passage, wherein the rotatable shaft is disposed within the sleeve shaft cavity. The bearing assembly has an inner cage or inner member and an outer cage or outer member and is disposed between the transmission housing and the sleeve shaft. The outer member has a first end and at least one fluid communication aperture disposed proximate the first end, wherein the outer member is attached to the transmission housing. The inner member has a first end proximate the at least one fluid communication aperture of the outer member and opposing the first end of the outer member, a second end, and at least one bearing element window disposed between the first end and the second end of the inner member. There is at least one bearing element disposed within the at least one bearing element window. At least one spacer member is disposed between the first end of the inner member and the first end of the outer member. At least one spacer member allows fluid to flow from the central fluid passage of the rotatable shaft through the at least one fluid communication aperture in the outer member.

In another aspect of the present invention, the bearing assembly has a seal attached to the first end of the outer member. In another aspect of the present invention, the at least one spacer member is sealed to the outer member by the seal.

In still another aspect of the present invention, the transmission housing has an annular channel in fluid communication with the fluid communication aperture of the outer member.

In still another aspect of the present invention, the outer member of the bearing assembly is attached to the transmission housing.

In still another aspect of the present invention, the bearing element is a roller bearing.

In still another aspect of the present invention, the bearing element is a needle bearing.

In still another aspect of the present invention, the spacer member is a wave shaped plate.

In still another aspect of the present invention, the spacer member is a spacer block.

In still another aspect of the present invention, the bearing assembly is located between any supporting member in the transmission and any rotatable shaft in the transmission.

Further objects, aspects and advantages of the present invention will become apparent by reference to the following description and appended drawings wherein like reference numbers refer to the same component, element or feature.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1A:
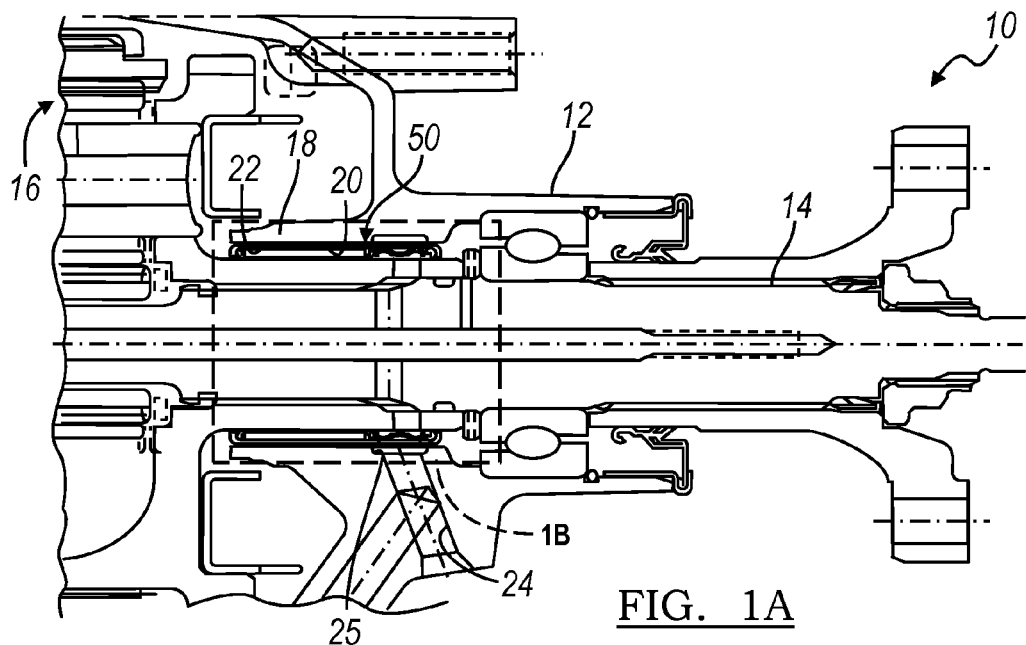
FIG. 1A is a partial cross-sectional view of an exemplary transmission having an embodiment of a bearing assembly according to the principles of the present invention.
Figure 1B:
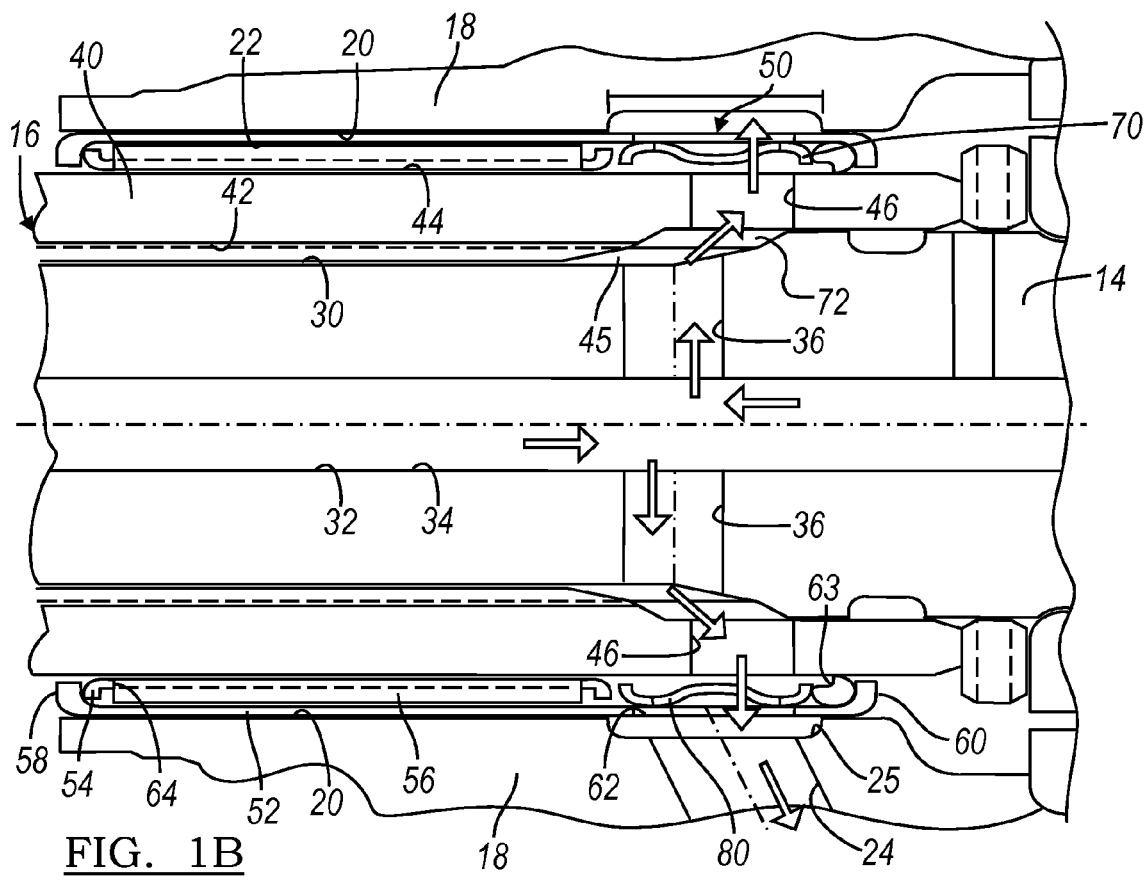
FIG. 1B is an enlarged view of a portion of the exemplary transmission and bearing assembly illustrated in FIG. 1A.

With reference to FIGS. 1A and 1B, a portion of an exemplary transmission for use in a motor vehicle is illustrated and generally indicated by reference number 10. The transmission 10 generally includes a housing member or transmission housing 12 that at least partially encloses and supports an input shaft or member (not shown), an output shaft or member 14, and a gearing arrangement 16 generally having a plurality of gear sets and torque transmitting devices. The gearing arrangement 16 is coupled between the input member and the output member or rotatable shaft 14. The gearing arrangement 16 is operable to provide a plurality of forward and reverse speed or torque ratios between the input member and the rotatable shaft 14.

The transmission housing 12 includes an internal sleeve portion 18 having an inner wall 20. The inner wall 20 defines a cavity or bore 22 sized to receive the rotatable shaft 14 and a portion of the gearing arrangement 16, as will be described in greater detail below. The transmission housing 12 further defines at least one fluid communication passage 24 that extends through the sleeve portion and communicates with an annular channel 25 located in the bore 22. The fluid communication passage 24 is operable to communicate a fluid, such as a lubricating oil, from the annular channel 25 through the transmission housing 12. The transmission housing 12 may include additional fluid communication passages and channels without departing from the scope of the present invention.

The rotatable shaft 14 generally includes an outer surface 30 and an inner surface 32. The inner surface defines a central bore or central fluid passage 34 that extends along at least a portion of a length of the rotatable shaft 14. The rotatable shaft 14 further defines at least one radially extending fluid communication passage 36 that communicates with the central fluid passage 34 and the outer surface 30.

In the example provided, the gearing arrangement 16 includes a gearing portion or sleeve shaft 40 having an inner toothed surface 42 and an outer surface 44. However, it should be appreciated that the gearing arrangement 16 may include any number or combination of gear sets, clutches, brakes, and/or synchronizers without departing from the scope of the present invention. The inner toothed surface 42 engages a toothed portion 45 on the outer surface 30 of the rotatable shaft 14. Accordingly, the sleeve shaft 40 is rotationally coupled with the rotatable shaft 14. Further, an annular channel 72 is defined by outer surface 30 of rotatable shaft 14 and inner toothed surface 42 of sleeve shaft 40 and is aligned with fluid communication passage 36 of the rotatable shaft 14. The sleeve shaft 40 in the example provided defines at least a pair of radially extending fluid communication passages 46 that extend between the inner toothed surface 42 and the outer surface 44. The radially extending fluid communication passages 46 are in communication with the radially extending fluid communication passage 36 of the rotatable shaft 14, as will be described in greater detail below.

The transmission 10 further includes at least one bearing assembly 50 for rotatably supporting the sleeve shaft 40 of the gearing arrangement 16 within the transmission housing 12. While in the particular embodiment provided, the bearing assembly 50 is employed to support the rotatable shaft 14 and sleeve shaft 40, it should be appreciated that the bearing assembly 50 may be employed between any supporting member and any rotating shaft or member within the transmission 10 without departing from the scope of the present invention. For example, the bearing assembly 50 may be located directly between the rotatable shaft 14 and the transmission housing 12, or between the input member and a portion of the gearing arrangement 16.

The bearing assembly 50 includes an outer member 52, an inner member 54, and a bearing element 56. The bearing element 56 is preferably a roller bearing or a needle bearing. The outer member 52 is generally cylindrically shaped and includes a first end 58 opposite a second end 60. The first end 58 and second end 60 both extend radially inward in the example provided. The outer member 52 defines an opening or fluid communication aperture 62 that extends through the outer member 52. The fluid communication aperture 62 is located proximate to the second end 60. In the example provided, the outer member 52 is attached to the inner surface 20 of the sleeve portion 18 of the transmission housing 12 such that the fluid communication aperture 62 communicates with the annular channel 25. A seal 63 is located within the outer member 52 and is operable to seal to the second end 60 and to the inner surface 22 of the outer member 52 and to outer surface 44 of the sleeve shaft 40 of the gearing arrangement 16. The seal 63 is configured to allow some fluid to flow past the seal 63, as will be described in greater detail below.

The inner member 54 is generally cylindrically shaped and is sized to be located within the outer member 52. The inner member 54 includes at least one bearing element window 64 that extends through the inner member 54. The bearing element 56 is located within the bearing element window 64. Accordingly, the inner member 54 is operable to contain the bearing element 56 while the bearing element is allowed to freely rotate or roll relative to the inner member 54 and the outer member 52. The bearing element 56 engages the outer surface 44 of the sleeve shaft 40 of the gearing arrangement 16.

The bearing assembly 50 further includes at least one separating or spacer member 70 located within the outer member 52. The spacer member 70 abuts the seal 63 and biases or spaces the inner member 54 axially towards the first end 58 of the outer member 52. Accordingly, the spacer member 70 prevents the inner member 54 and the bearing element 56 from being located overtop the fluid communication aperture 62 in the outer member 52. In the particular example provided, the spacer member 70 is a wave shaped plate having apertures, however, the spacer member 70 may take various forms such as, for example, a spacer block.

The bearing assembly 50 allows communication of fluid between any two components located on either side of the bearing assembly 50, such as the transmission housing 12 and the sleeve shaft 40 in the particular example provided. For example, fluid flow through the bore 34 of the rotatable shaft 14 may communicate through the fluid communication passage 36, through annular channel 72, through the fluid communication passage 46 of the sleeve shaft 40, through the fluid communication aperture 80 of the spacer member 70, and to the annular channel 25 and the fluid communication passage 24 of the transmission housing 12. As noted above, the spacer member 70 prevents the inner member 54 and the bearing element 56 from interfering with the flow of fluid through the bearing assembly 50. Additionally, fluid may flow at a controlled rate around the seal 63 to reach components between the sleeve shaft 40 and the transmission housing 12.

The description of the invention is merely exemplary in nature and variations that do not depart from the gist of the invention are intended to be within the scope of the invention. Such variations are not to be regarded as a departure from the spirit and scope of the invention.

The invention claimed is:

1. A transmission assembly having a plurality of fluid communication passages for carrying fluid, the transmission assembly comprising:
   a transmission housing having at least one of the plurality of fluid communication passages, an annular channel in fluid communication with the fluid communication passage, and an inner wall that defines a housing cavity;
   a sleeve shaft having at least one radially extending fluid communication passage and a central bore that defines a sleeve shaft cavity, wherein the sleeve shaft is disposed within the housing cavity;
   a rotatable shaft having at least one radially extending fluid communication passage and a central bore that defines a central fluid passage, wherein the rotatable shaft is disposed within the sleeve shaft cavity;
   a bearing assembly disposed between the sleeve shaft and the inner wall of the transmission housing, the bearing assembly including:
      an outer member having a first end and at least one fluid communication aperture disposed proximate the first end, wherein the outer member is attached to the inner wall of the transmission housing;

an inner member having a first end proximate the at least one fluid communication aperture of the outer member and opposing the first end of the outer member, a second end, and at least one bearing element window disposed between the first end and the second end of the inner member;

at least one bearing element disposed within the at least one bearing element window; and at least one spacer member disposed between the first end of the inner member and the first end of the outer member, wherein the spacer member allows the fluid to flow from the central fluid passage of the rotatable shaft through the at least one fluid communication aperture in the outer member.

2. The transmission assembly of claim 1, wherein the bearing assembly further comprises a seal disposed at the first end of the outer member.

3. The transmission assembly of claim 1, wherein the bearing element is a roller bearing.

4. The transmission assembly of claim 1, wherein the bearing element is a needle bearing.

5. The transmission assembly of claim 1, wherein the spacer member is a wave shaped plate having apertures.

6. A transmission assembly having a plurality of fluid communication passages for carrying a fluid, the transmission assembly comprising:

a transmission housing having at least one of the plurality of fluid communication passages, an annular channel in fluid communication with the fluid communication passage, and an inner wall that defines a housing cavity;

a sleeve shaft having at least one radially extending fluid communication passage and a central bore that defines a sleeve shaft cavity, wherein the sleeve shaft is disposed within the housing cavity;

a rotatable shaft having at least one radially extending fluid communication passage and a central bore that defines a central fluid passage, wherein the rotatable shaft is disposed within the sleeve shaft cavity;

a bearing assembly disposed between the sleeve shaft and the inner wall of the transmission housing, the bearing assembly including:

an outer member having a first end and at least one fluid communication aperture disposed proximate the first end, wherein the outer member is attached to the inner wall of the transmission housing;

an inner member having a first end proximate the at least one fluid communication aperture of the outer member and opposing the first end of the outer member, a second end, and at least one bearing element window disposed between the first end and the second end of the inner member;

at least one bearing element disposed within the at least one bearing element window;

a seal disposed at the first end of the outer member; and at least one wave shaped plate disposed between the first end of the inner member and the first end of the outer member, wherein the wave shaped plate allows the fluid to flow from the central fluid passage of the rotatable shaft through the at least one fluid communication aperture in the outer member.

7. The transmission assembly of claim 6, wherein the bearing element is a needle bearing.

8. The transmission assembly of claim 6, wherein the bearing element is a roller bearing.

9. A bearing assembly disposed between a rotatable shaft and a supporting member, the bearing assembly comprising:

an outer member having a first end and at least one fluid communication aperture disposed proximate the first end, wherein the outer member is attached to the supporting member;

an inner member having a first end proximate the at least one fluid communication aperture of the outer member and opposing the first end of the outer member, a second end, and at least one bearing element window disposed between the first end and the second end of the inner member;

at least one bearing element disposed within the at least one bearing element window; and at least one spacer member disposed between the first end of the inner member and the first end of the outer member, wherein the spacer member allows a fluid to flow from the rotatable shaft through the at least one fluid communication aperture in the outer member.

10. The bearing assembly of claim 9, wherein the bearing assembly further comprises a seal disposed at the first end of the outer member.

11. The bearing assembly of claim 9, wherein the bearing element is a roller bearing.

12. The bearing assembly of claim 9, wherein the bearing element is a needle bearing.

13. The bearing assembly of claim 9, wherein the spacer member is a wave shaped plate having apertures.

14. An assembly comprising:

a first member having a fluid communication passage and having an inner wall that defines a cavity;

a second member disposed within the cavity and having a fluid communication passage;

a bearing assembly disposed between the first member and the second member, the bearing assembly including:

an outer member having a first end and at least one aperture disposed proximate the first end, wherein the outer member is attached to the inner wall of the first member;

an inner member having a first end proximate the at least one aperture and radially opposing the first end of the outer member, a second end axially opposite the first end, and at least one bearing element window disposed between the first end and the second end of the inner member;

at least one bearing element disposed within the at least one bearing element window and in contact with the second member; and at least one spacer member disposed axially between the first end of the inner member and the first end of the outer member, the spacer member having at least one opening, wherein the opening of the spacer member is in radial alignment with the fluid communication passage of the first member and in radial alignment with the fluid communication passage of the second member.

* * * * *